(12) United States Patent
Ma et al.

(10) Patent No.: US 10,430,991 B2
(45) Date of Patent: Oct. 1, 2019

(54) SYSTEM, APPARATUS, AND METHOD FOR OPTIMIZING A SCALABLE GPU VIRTUALIZATION

(71) Applicant: Shanghai Jiao Tong University, Shanghai (CN)

(72) Inventors: Jiacheng Ma, Shanghai (CN); Haibing Guan, Shanghai (CN); Zhengwei Qi, Shanghai (CN); Yongbiao Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 15/891,979

(22) Filed: Feb. 8, 2018

(65) Prior Publication Data

US 2019/0228557 A1     Jul. 25, 2019

(30) Foreign Application Priority Data

Jan. 25, 2018  (CN) .......................... 2018 1 0073076

(51) Int. Cl.
  *G06T 15/00*   (2011.01)
  *G06F 9/455*   (2018.01)
  *G06T 1/20*    (2006.01)
  *G06T 15/60*   (2006.01)

(52) U.S. Cl.
CPC ............ *G06T 15/005* (2013.01); *G06F 9/455* (2013.01); *G06T 1/20* (2013.01); *G06T 15/60* (2013.01); *G06T 2200/08* (2013.01); *G06T 2215/12* (2013.01)

(58) Field of Classification Search
CPC ......... G06T 15/00; G06T 15/005; G06T 1/20; G06T 15/50; G06T 2215/12; G06T 2200/08; G06F 9/455
USPC ......................................................... 345/419
See application file for complete search history.

(56) References Cited

U.S. PATENT DOCUMENTS 9,619,860 B2 *   4/2017   Dong .................... G06F 12/10
9,824,026 B2 *  11/2017   Dong .................... G06F 12/02

OTHER PUBLICATIONS

Xue M, Tian K, Dong Y, Ma J, Wang J, Qi Z, He B, Guan H. gScale: Scaling up GPU Virtualization with Dynamic Sharing of Graphics Memory Space. InUSENIX Annual Technical Conference Jun. 22, 2016 (pp. 579-590).*
Park Y, Gu M, Yoo S, Kim Y, Park S. DymGPU: Dynamic Memory Management for Sharing GPUs in Virtualized Clouds. In2018 IEEE 3rd International Workshops on Foundations and Applications of Self* Systems (FAS* W) Sep. 3, 2018 (pp. 51-57). IEEE.*

* cited by examiner

*Primary Examiner* — Phu K Nguyen
(74) *Attorney, Agent, or Firm* — Anova Law Group, PLLC (57) ABSTRACT

Described herein is a method for optimizing a scalable GPU virtualization, comprising: providing each vGPU with a private shadow graphics translation table (GTT); copying vGPU's private shadow GTT to physical GTT along with the context switch, wherein the private shadow GTT allows vGPUs to share an overlapped range of a global graphics memory space.

14 Claims, 11 Drawing Sheets

SYSTEM, APPARATUS, AND METHOD FOR OPTIMIZING A SCALABLE GPU VIRTUALIZATION

CROSS-REFERENCES TO RELATED APPLICATIONS

This application claims priority to Chinese Patent Application No. 201810073076.5, filed on Jan. 25, 2018, the entire content of which is incorporated by reference.

TECHNICAL FIELD

This invention relates generally to the field of computer processors. More particularly, the invention relates to a system, apparatus, and method for optimizing a scalable GPU virtualization.

BACKGROUND

The Graphic Processing Unit (GPU) is playing an indispensable role in cloud computing as GPU efficiently accelerates the computation of certain workloads such as 2D and 3D rendering. With increasing GPU intensive workloads deployed on cloud, cloud service providers introduce a new computing paradigm called GPU Cloud to meet the high demands of GPU resources, e.g., Amazon EC2 GPU instance and Aliyun GPU server. As one of the key enabling technologies of GPU cloud, GPU virtualization is intended to provide flexible and scalable GPU resources for multiple instances with high performance. To achieve such a challenging goal, several GPU virtualization solutions were introduced, such as GPUvm and gVirt. gVirt, also known as GVT-g, is a full virtualizatio solution with mediated pass-through support for Intel Graphics processors. In each virtual machine (VM), running with native graphics driver, a virtual GPU (vGPU) instance is maintained to provide performance critical resources directly assigned, since there is no hypervisor intervention in performance critical paths. Thus, it optimizes resources among the performance, feature, and sharing capabilities.

For a virtualization solution, scalability is an indispensable feature which ensures high resource utilization by hosting dense VM instances on cloud servers. Although gVirt successfully puts GPU virtualization into practice, it suffers from scaling up the number of vGPU instances. The current release of gVirt only supports 3 guest vGPU instances on one physical Intel GPU, which limits the number of guest VM instances down to 3. In contrast, CPU virtualization techniques (e.g., Xen 4.6 guest VM supports up to 256 vCPUs) are maturely achieved to exploit their potential. The mismatch between the scalability of GPU and other resources like CPU will certainly diminish the number VM instances. Additionally, high scalability improves the consolidation of resources. GPU workloads can fluctuate significantly on GPU utilization. Such low scalability of gVirt could result in severe GPU resource underutilization. If more guest VMs can be consolidated to a single host, cloud providers have more chances to multiplex the GPU power among VMs with different workload patterns (e.g., scheduling VMs with GPU intensive or idle patterns) so that the physical resource usage of GPU can be improved.

BRIEF SUMMARY

Described herein are various implementations for optimizing a scalable GPU virtualization.

In certain implementations, it provides a method for optimizing a scalable GPU virtualization, comprising: providing each vGPU with a private shadow graphics translation table (GTT); copying vGPU's private shadow GTT to physical GTT along with the context switch, wherein the private shadow GTT allows vGPUs to share an overlapped range of a global graphics memory space.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Driven by high level programming APIs like OpenGL and DirectX, graphics driver produces GPU commands into primary buffer and batch buffer while GPU consumes the commands accordingly. The primary buffer, also called the ring buffer, is designed to deliver the primary commands with a ring structure, but the size of the primary buffer is limited. To make up for the space shortage, batch buffers are linked to the primary buffer to deliver most of the GPU commands. GPU commands are produced by the CPU and transferred from CPU to GPU in batches. To ensure that GPU consumes the commands after CPU produces them, a notification mechanism is implemented in the primary buffer with two registers. The tail register is updated when CPU finishes the placement of commands, and it informs GPU to get commands in the primary buffer. When GPU completes processing all the commands, it writes the head register to notify CPU for incoming commands.

Figure 1:
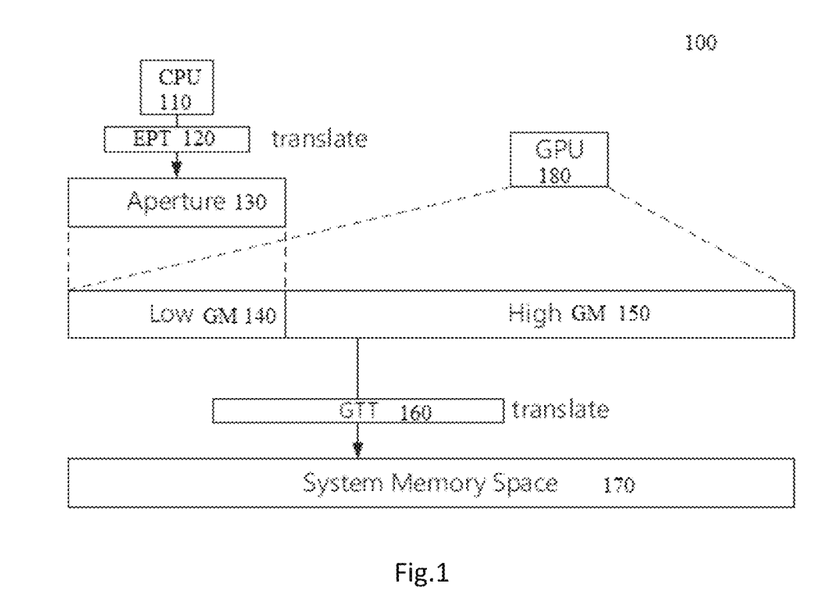
FIG. 1 is a block diagram of an embodiment of Graphics translation table (GTT).

FIG. 1 is a block diagram of an embodiment of Graphics translation table (GTT). Graphics translation table 160, sometimes known as global graphics translation table, is a page table providing the translations from logical graphics memory address to physical memory address, as FIG. 1 shows. The physical memory space served by GTT 160 is called global graphics memory space, which is used by all GPU components, such as the render engine and the display engine. According to the architecture of GPU, GTT is a unique global register of GPU which resides in MMIO (memory mapping input/output) range. The CPU 110 does not access the global graphics memory space directly. However, through the Aperture 130, which is an MMIO range, CPU 110 could also access the global graphics memory space. This CPU's visible part of global graphics memory is called low global graphics memory 140, while the rest part is called high global graphics memory (high GM) or hidden global graphics memory (hidden GM) 150. Note that the mapping between low GM 140 and aperture 130 is setup by the hardware directly.

In some embodiments, GPU 180 has a 2 MB GTT which maps to a 2 GB graphics memory space. The aperture range could maximally be 512 KB which maps to 512 MB graphics memory space visible by CPU 110. Accordingly, the low GM 140 is 512 MB, while the high GM 150 is 1536 MB. Besides the graphics translation table 160, there is another type of GPU page tables called per-process graphics translation table (PPGTT) which provides each process its own local graphics memory space. Unlike GTT, PPGTT resides in the main memory. Sometimes, GPU 180 also uses a group of fence registers to access global graphics memory. Each GPU 180 may only have 32 fence registers.

The embodiments of the invention present gScale, a practical, efficient and scalable GPU virtualization solution. To increase the number of vGPU instances, gScale targets at the bottleneck design of gVirt and introduces a dynamic sharing scheme for global graphics memory space. gScale provides each vGPU instance with a private shadow graphics translation table (GTT) to break the limitation of global graphics memory space. gScale copies vGPU's private shadow GTT to physical GTT along with the context switch. The private shadow GTT allows vGPUs to share an overlapped range of global graphics memory space, which is an essential design of gScale. However, it is nontrivial to make the global graphics memory space sharable, because global graphics memory space is both accessible to CPU and GPU. gScale implements a novel ladder mapping mechanism and a fence memory space pool to let CPU access host physical memory space serving the graphics memory, which bypasses the global graphics memory space.

However, given that GTT is actually a memory-mapped register, shadow GTT has to be copied to physical GTT while switching context, which is a time-consuming operation. In order to solve the problem, gScale proposes slot sharing to improve the performance of vGPUs under a high density of instances. A predictive GTT copy is also introduced to copy shadow GTT to the physical one before context switch, and use predictive-copy aware scheduling to maximize this optimization.

Figure 2:
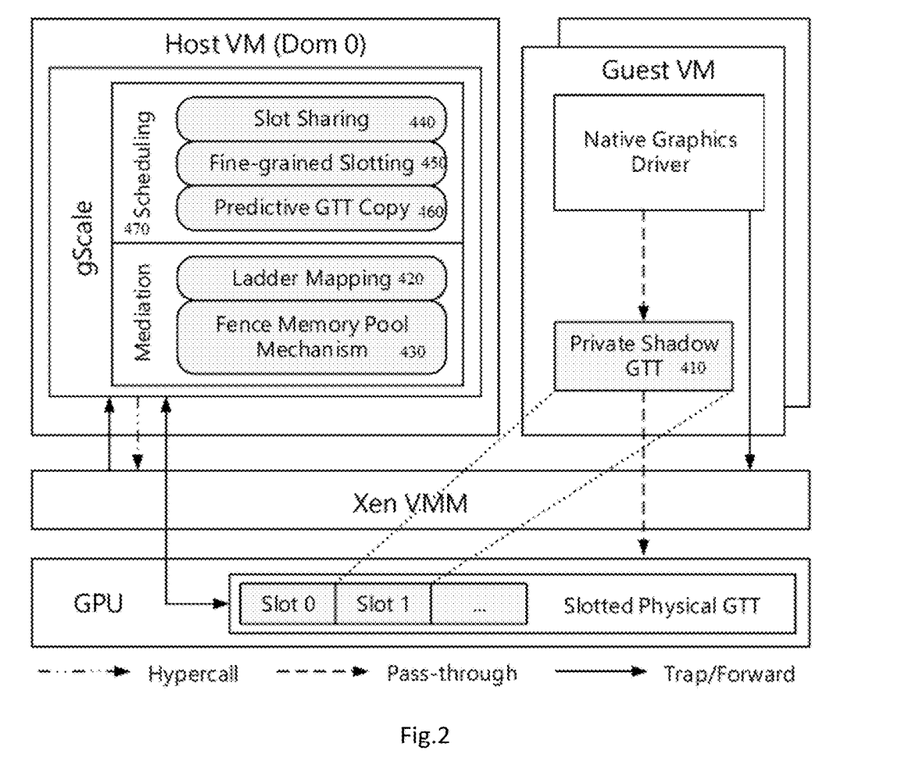
FIG. 2 is a block diagram of an embodiment of the architecture of gScale.

FIG. 2 is a block diagram of an embodiment of the architecture of gScale. To break the limitation of global graphics memory, gScale proposes a dynamic sharing scheme which combines partition and sharing together. For the access of GPU, a private shadow GTT 410 is introduced to make global graphics memory space sharable. For the access of CPU, ladder mapping unit 420 is included to allow CPU to directly access host physical memory space serving the graphics memory, which bypasses the global graphics memory space. For concurrent accesses of CPU and GPU, gScale reserves a part of low global graphics memory as the fence memory space pool 430 to ensure the functionality of fence registers. gScale also divides the high global graphics memory space into several slots to leverage the overhead caused by private shadow GTT copying. However, due to the overhead of copying shadow GTT to physical GTT while switching context, the performance loss of gScale is serious. To solve this problem, a predictive GTT copy unit 460 is implemented, which improves the performance of gScale by copying shadow GTT 410 to the right place before context switch. A predictive-copy aware scheduling unit 470 is used to improve the performance of gScale under a high density of instances. In present invention, the design of gScale addresses three technical challenges: (1) how to make global graphics memory space sharable among vGPUs, (2) how to let CPU directly access host memory space serving the graphics memory, which bypasses global graphics memory space, and (3) how to minimize the performance impact of gScale under a high instance density.

It is a non-trivial task to make the global graphics memory space sharable among vGPUs, for that CPU and GPU access the low global graphics memory space simultaneously. However, high global graphics memory space is only accessible to GPU, which makes it possible for vGPUs to share high global graphic memory space.

Figure 3:
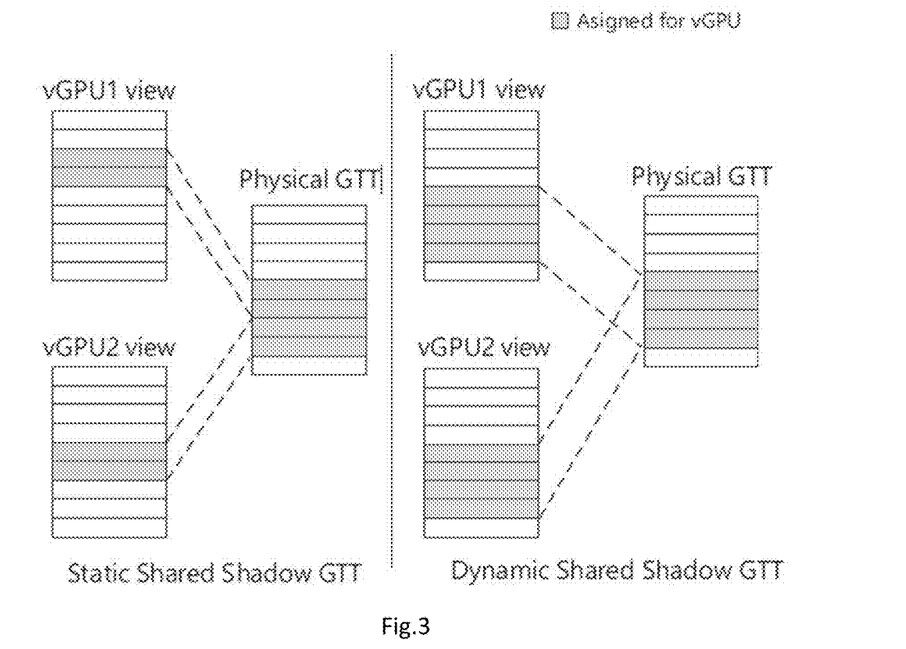
FIG. 3 shows the static shared shadow GTT and gScale's dynamic private shadow GTT.

FIG. 3 shows the static shared shadow GTT and gScale's dynamic private shadow GTT. Specifically, shared shadow GTT is introduced to apply the resource partition on global graphics memory space. It provides every vGPU with a same view of physical GTT, while each vGPU is assigned with a different part of shadow GTT. Accordingly, each vGPU occupies the different ranges of global graphics memory space from others. However, gScale's private shadow GTT is specific for each vGPU, and it provides vGPU with a unique view of global graphics memory space. Moreover, the translations that private shadow GTT contains are only valid for its corresponding vGPU. And gScale copies vGPU's private shadow GTT onto the physical GTT along with the context switch to ensure that translations of physical GTT are correct for the upcoming vGPU. When vGPU owns the physical engine, gScale synchronizes the modifications of physical GTT to vGPU's private shadow GTT.

Figure 4:
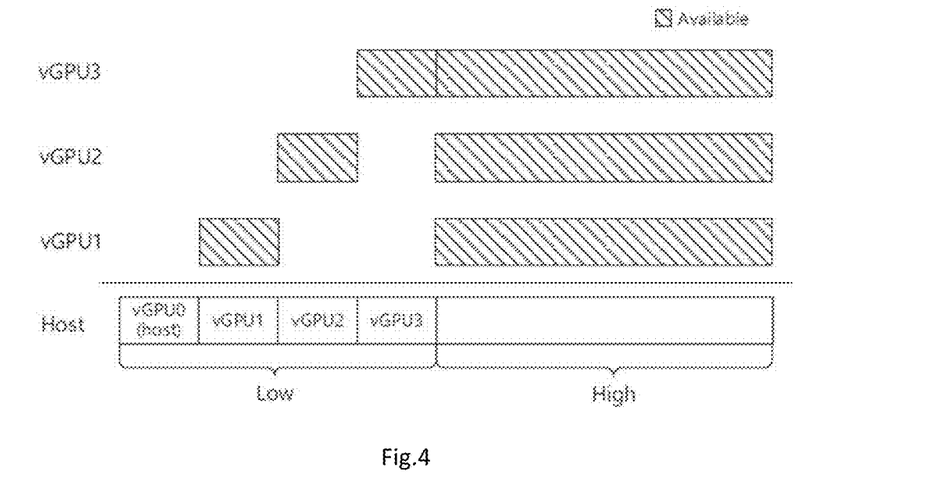
FIG. 4 is an embodiment of sharing high global graphics memory space.

By manipulating the private shadow GTTs, gScale could allow vGPUs to use an overlapped range of global graphics memory, which makes the high global graphics memory space sharable, as shown in FIG. 4. However, low graphics memory space is still partitioned among the vGPUs, for that it is also visible to CPU. Simply using private shadow GTT to make low graphics memory space sharable would provide vCPU with wrong translations.

Unfortunately, copying shadow GTT to physical GTT is a time-consuming job, the context switch time will become significantly longer, which will negatively influence the performance. This is a serious problem, and will be discussed and solved by slot sharing unit 440, fine-grained slotting unit 450, and predictive GTT copy unit 460.

Writing private shadow GTT onto physical GTT incurs the overhead. gScale introduces on-demand copying to reduce unnecessary copying overhead. Although gScale is able to share the whole high GM, it is not necessary because more global graphics memory does not increase the performance of vGPU. On the contrary, sharing more high GM could increase the overhead of copying shadow GTT. As a result, gScale only configures vGPU with sufficient global graphics memory. Although the size of private GTT is exactly the same with physical GTT, vGPU is configured with a portion of available global graphics memory space (corresponding to only part of vGPU's private shadow GTT). By taking advantage of this characteristic, gScale only copies the demanding part of vGPU's private shadow GTT to the physical GTT, which mitigates the unnecessary overhead.

It is not enough to only make high global graphics memory space sharable because the static partition applied to low global graphics memory space still constrains the number of vGPUs. Low global graphics memory space is accessible to both CPU and GPU, while CPU and GPU are scheduled independently. gScale has to present VMs with their low global graphics memory spaces at all time. Some GPUs do not have dedicated graphics memory, while the graphics memory is actually allocated from system memory. The graphics memory of VM actually resides in host physical memory. gScale proposes the ladder mapping to allow CPU to directly access the host memory space serving the graphics memory which bypasses the global graphics memory space.

When a VM is created, gScale maps VM's guest physical memory space to host physical memory space by Extended Page Table (EPT) 120, as shown in FIG. 1. EPT 120 is a hardware supported page table for virtualization, which translates guest physical address to host physical address. Through the aperture 130, a range of MMIO space in host physical memory space, CPU could access the low part of global graphics memory space. With the translations in GTT, the global graphics memory address is translated into host physical address serving the graphics memory. Finally, CPU could access the graphics data residing in host physical memory space.

Figure 5:
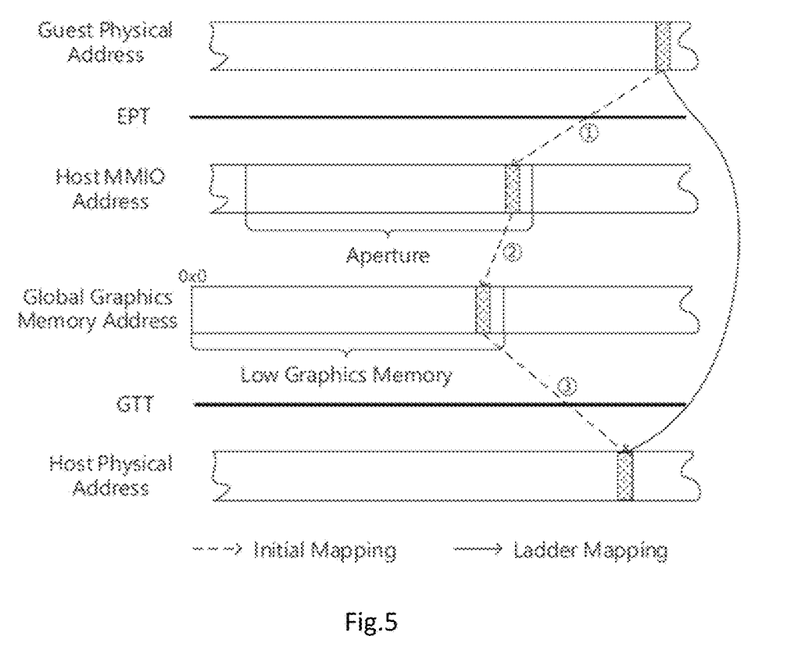
FIG. 5 shows the conventional mapping and ladder mapping.

FIG. 5 shows the conventional mapping and ladder mapping. For conventional mapping, through the Step 1, 2 and 3, guest physical address is translated into host physical address. When the process is completed, a translation between guest physical address and host physical address serving the graphics memory is established. After that, gScale modifies the translation of EPT to directly translate the guest physical address to host physical address serving the graphics memory without the reference of global graphics memory address. This mechanism is called the ladder mapping, which is constructed when CPU accesses global graphics memory space by referring to the GTT. gScale monitors the GTT at all time, and builds ladder mapping as long as the translation of GTT is modified by CPU. In a nutshell, the ladder mapping is to allow CPU to access host memory space bypassing the global graphics memory space. After that, gScale could make low global graphics memory space sharable with private shadow GTT.

Although the ladder mapping is used to force CPU to bypass the global graphics memory space, there is one exception that CPU could still access global graphics memory space through fence registers. Fence register contains the information about tiled formats for a specific region of graphics memory. When CPU accesses this region of global graphics memory recorded in a fence register, it needs the format information in the fence to operate the graphics memory. However, after the ladder mapping is enabled, the global graphics memory space is no longer available for CPU. The global graphics memory address in fence register is invalid for CPU.

Figure 6:
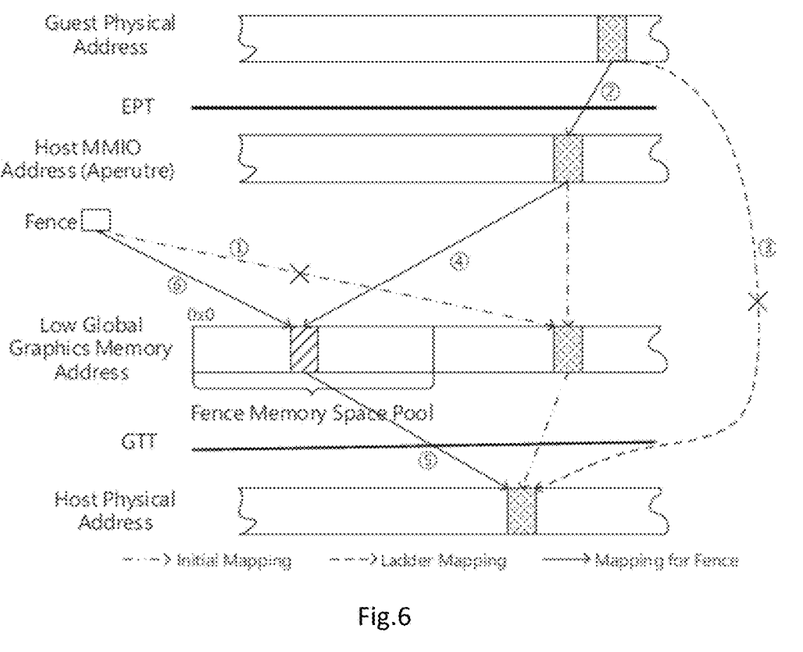
FIG. 6 illustrates the workflow of how fence memory space pool works.

To address the malfunction of fence registers, gScale reserves a dedicated part of low global graphics memory to work for fence registers, and enables dynamic management for it. This reserved part of low global graphics memory is called the fence memory space pool. FIG. 6 illustrates the workflow of how fence memory space pool works:

Step 1, when a fence register is written by graphics driver, gScale acquires the raw data inside of the register. By analyzing the raw data, gScale gets the format information and the global graphics memory space range served by this fence register.

Step 2, by referring to the initial mapping of EPT, gScale finds the guest physical memory space range which corresponds to the global graphics memory space range in the register. Though the initial mapping of EPT is replaced by ladder mapping, it is easy to restore the original mapping with a backup, because the initial mapping is continuous with clear offset and range. After that, this range of guest physical memory space is again mapped to a range of physical memory space within the aperture.

Step 3, gScale suspends the ladder mapping for this range of guest physical memory space, and allocates a range of memory space in the fence memory space pool with same size.

Step 4, gScale maps the host physical memory space in aperture to the memory space newly allocated in fence memory space pool.

Step 5, gScale copies the entries of GTT serving the graphics memory space in fence register to the part of GTT corresponding to the graphics memory space newly allocated in fence memory space pool.

Step 6, gScale writes the new graphics memory space range along with untouched format information into the fence register. To this end, gScale constructs a temporary mapping for fence register, and CPU could finally use the information in fence register correctly.

When a fence register is updated, gScale restores the ladder mapping for the previous range of global graphics memory space that fence register serves, and frees its corresponding memory space in the fence memory space pool. After that, gScale repeats the procedure as we mentioned above to ensure the updated register work correctly with fence memory space pool.

Figure 7:
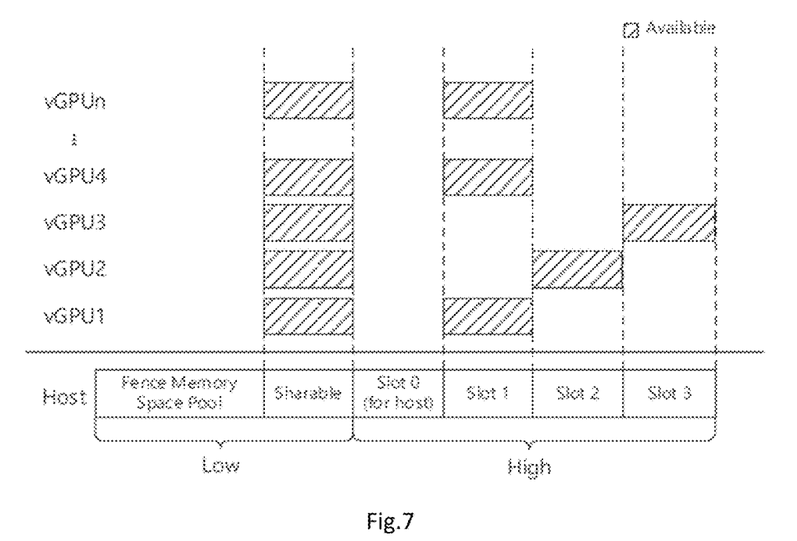
FIG. 7 shows an embodiment of the layout of physical global graphics memory space.

In real cloud environments, the instances hosted by cloud may not remain busy at all time, while some instances become idle after completing their tasks. gScale implements slot sharing to improve the performance of vGPU instance under a high instance density. FIG. 7 shows an embodiment of the layout of physical global graphics memory space. As shown in FIG. 7, gScale divides the high global graphics memory space into several slots, and each slot could hold one vGPU's high graphics memory. gScale could deploy several vGPUs in the same slot. As mentioned above, high global graphics memory space may be 1536 MB, while 384 MB is sufficient for one VM. However, gScale only provides slots for VMs in high graphics memory space, for that the amount of low global graphics memory space is 512 MB which is much smaller than high global graphics memory space. There is no free space in low graphics memory space spared for slots.

As an optimization, gScale does not conduct context switch for idle vGPU instances, which saves the cost of context switch and private shadow GTT copying. For vGPU instances without workloads, they do not submit commands to physical engine. gScale skips them, and focuses on serving the instances with heavy workloads. At the same time, gScale does not copy entries from idle vGPU's private shadow GTT to physical GTT. With slot sharing, if there is only one active vGPU in a slot, this vGPU will own the slot. gScale keeps its high global memory part of private shadow GTT on physical GTT without entry copying. With this optimization, slot sharing could effectively reduce the overhead of private shadow GTT copying, and the performance improvement will be discussed later in this description.

gScale currently has 4 slots (1536 MB/384 MB=4): one is reserved for host vGPU, while the rest 3 are shared by guest vGPUs. Slot sharing helps gScale improve guest vGPU's performance under a high instance density while only a few vGPUs are busy. The slot sharing could be utilized if the cloud provider deploys the guest VMs meticulously. For example, cloud providers let a busy vGPU share one slot with a few idle vGPUs.

Cloud vendors may need to provide vGPUs with different configurations, e.g. size of graphics memory, to their customers. Some special applications may need more graphics memory to behave correctly or perform better. gScale provides a mechanism or unit called fine-grained slotting to let cloud vendors configure different VMs with different graphics memory size.

Figure 8:
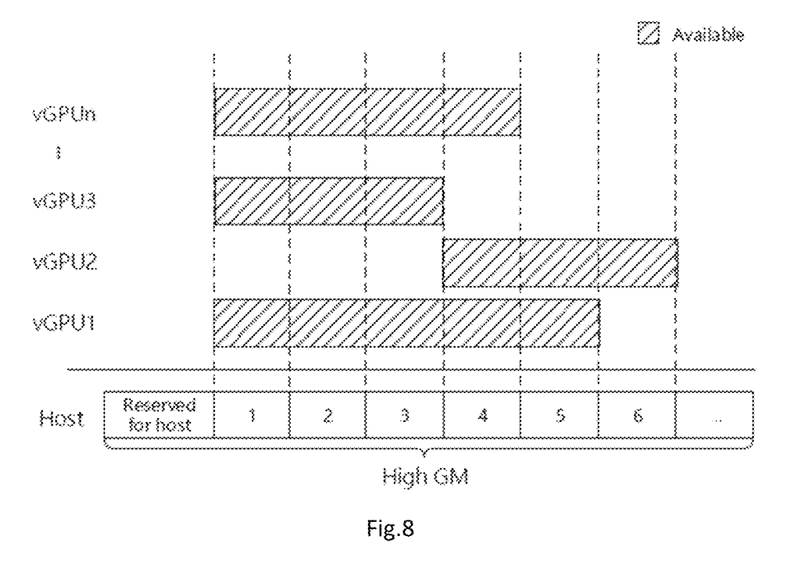
FIG. 8 shows an example of the layout of physical global graphics memory space using fine-grained slotting.

FIG. 8 shows an example of the layout of physical global graphics memory space using fine-grained slotting. gScale divides the high graphics memory space into multiple subslots and each VM can occupy certain adjacent subslots. In this ease, vGPU1 occupies subslot 1 to 5,and vGPU2 occupies subslot 4 to 6. When a context switch occurs between vGPU1 and vGPU2, only subslot 4 and 5 need to be replaced, because subslot 6 of vGPU2 is already on the hardware. With fine-grained slotting, the slot sharing mechanism can provide cloud vendors a more flexible configuration interface.

Figure 9:
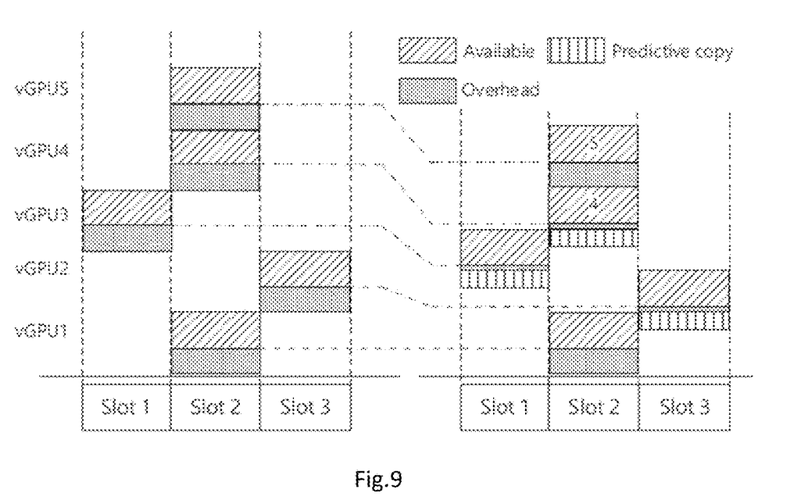
FIG. 9 shows how gScale reduces total execution time by predictive GTT copy.

As implemented by slot sharing, high global graphics memory is divided into 4 slots and several vGPUs can be deployed in the same slot. When gScale conducts context switch between vGPUs, a VM's shadow GTT is copied to physical GTT, which may result in large overhead and limits the performance of workloads. The purpose of predictive GTT copy unit is to reduce this overhead by copying shadow GTT in advance of context switch. FIG. 9 shows how gScale reduces total execution time by predictive GTT copy. A VM's Shadow GTT is copied to its corresponding slot while another VM still occupies GPU and therefore context switch time is shortened. However, predictive GTT copy will fail in one occasion, in which two adjacent VMs in the scheduling sequence are deployed on the same slot, e.g. vGPU4 and vGPU5 in FIG. 9. In this case, gScale should give up predictive GTT copy, because the part of GTT is currently used by the running VM.

| Algorithm 1 predictive GTT copy algorithm |
| --- |
| Initialization: |
|     Set NextVmId[0_31][0_2] = 0; Pid = previous VM id;<br>    Cid = current VM id; Nid = 0; |
| Thread: |
| 1:    loop<br>2:        # scheduled out after predictive GTT copy<br>3:        SLEEP( )<br>4:        # waken up while switching context<br>5:        # updating NextVmId array<br>6:        NextVmId[Pid][0] ← NextVmId[Pid][1]<br>7:        NextVmId[Pid][1] ← NextVmId[Pid][2]<br>8:        NextVmId[Pid][2] ← Cid<br>9:        Nid ← the majority in NextVmId[Cid][0_2]<br>10:      # if predictive GTT copy results in slot conflicts<br>11:      if slot id of VM Cid == slot id of VM Nid then<br>12:          continue<br>13:      end if<br>14:      # predictive GTT copy<br>15:      COPY_GTT(Nid)<br>16:    end loop |

To achieve this algorithm, a thread called pre-copy-thread is responsible for the work related to predictive GTT copy, such as predicting which VM may become the next running one (note that an idle VM will not be scheduled) according to a historical record voting, and copying the shadow one to the physical one. The thread conducting context switch will wake up pre-copy-thread when context switch occurs.

Algorithm 1 shows how pre-copy-thread predicts which VM will run in the next time slice according to the last three scheduling sequences. Before pre-copy-thread is waken up, Cid and Pid will be set to the ID of VMs before and after context switch. It should he noticed that the correctness of array NextVmId which indicates the next VM to be switched in is not guaranteed. But an inaccurate prediction of next VM does no harm to the correctness because the thread conducting context switch will check if the shadow GTT is copied to physical GTT correctly.

As mentioned above, pre-copy-thread will give up predictive GTT copy when the two VMs before and after context switch are deployed on the same slot. In order to maximize the optimization of predictive GTT copy, gScale should try to avoid this situation by carefully arranging the scheduling sequence of VMs. The VMs which are involved in scheduling is not stable because some VMs become idle after completing their tasks. The predictive-copy aware scheduling unit may arrange the context switch sequence of busy VMs on multiple slots to avoid the situation that two neighboring VMs in the scheduling sequence are deployed on the same slot.

Predictive-copy aware scheduling also solves another problem in pre-copy-thread. The prediction of the next VM by previous scheduling sequence is not precise. Once the prediction is incorrect, predictive GTT copy optimization is ineffective in one round. However, with the assistant of predictive-copy aware scheduling, pre-copy-thread can get the accurate scheduling sequence, thus it makes no misprediction.

Predictive-copy aware scheduling arranges the context switch sequence of vGPUs on multiple slots by the following workflow: In step a), finding a first slot with the maximum number of vGPUs in all of the slots; in step b), poping one vGPU from the first slot, in step c), finding a second slot with the maximum number of vGPUs in the remaining slots; in step d), poping one vGPU from the second slot; in step e), inserting the popped vGPUs into an OutputVmList which indicates the scheduling; sequence of a single round; in step f), returning to step a) and repeating step a) to step e). If all the other slots firstly pop out their vGPUs while some vGPUs in the last slot are not popped out, insert all remaining VMs in the last slot into the OutputVmList.

Algorithm 2 shows how gScale arranges the context switch sequence of VMs on multiple slots. The procedure getNextVm will find the slot with the maximum number of VMs (for example slot k). Then it alternately pops VMs from slot k and other slots and inserts the VMs into OutputVmList which indicates the scheduling sequence of a single round. If slot k firstly pops out all of its VMs, procedure getNextVm will be called again to determine the scheduling sequence of the VMs on other slots. If all the other slots firstly pop out their VMs while some VMs in slot k are not popped out, we simply insert all remaining VMs in slot k into OutputVmList. In this case, there exists no scheduling sequence satisfying that no VMs with the same slot are adjacent in the sequence because more than half of the VMs are deployed on slot k.

---
Algorithm 2 predictive-copy aware scheduling algorithm
---
Initialization:

Suppose SlotVmList[1_SlotNum] is a two-dimensional array where SlotVmList[i] is a list indicating all the VMs deployed on the same slot, but this does not mean that they are deployed on slot i; OutputVMList = { };

Algorithm:

```
1:     function MAXVMSLOT(integer Size)
2:        integer i
3:        find SlotVmList[i] in SlotVmList[1_Size] such
          that the length of SlotVmList[i] is greater than that of
          any other array in SlotVmList[1_Size]
4:        return i
5:     end function
6:     function GETNEXTVM(integer MaxVmSlot)
7:        integer i = MAXVMSLOT(MaxVMSlot)
8:        # put SlotVmList[i] to the end of SlotVmList
9:        SWAP(SlotVmList[i], SlotVmList[MaxVmSlot])
10:       while SlotVmList[MaxVmSlot].size != 0 do
11:          CurVm = SlotVmList[MaxVmSlot].pop( )
12:          OutputVmList.pushback(CurVm)
13:          integer i = MAXVMSLOT(MaxVmSlot − 1)
14:          if SlotVmList[i].size == 0 then
15:             for CurVm in SlotVmList[MaxVmSlot] do
16:                OutputVmList.pushback(CurVm)
17:             end for
18:             return
19:          end if
20:          OutputVmList.pushback(SlotVmList[i].pop( ))
21:       end while
22:       if MaxVmSlot > 1 then
23:          return GETNEXTVM(MaxVmSlot − 1)
24:       end if
25:    end function
```

EVALUATION

In this section, the scalability of gScale is evaluated when it hosts an increasing number of guest vGPUs with GPU workloads. We compare the performance of gScale with gVirt, and it turns out gScale brings negligible performance trend. Also, the performance of gScale, its basic version (without slot sharing) and its slotted version (with slot sharing but without predictive copy) under a high density of instances is compared. Furthermore, we emulate a more complex environment, to show gScale's usability in industrial environment.

TABLE 1

Experimental Configuration

| Host Machine Configuration | |
|---|---|
| CPU | Intel E3-1285 v3 (4 Cores, 3.6 GHz) |
| GPU | Intel HD Graphics P4700 |
| Memory | 32 GB |
| Storage | SAMSUNG 850Pro 256 GB * 3 |
| Host VM Configuration | |
| vCPU | 4 |
| Memory | 3072 MB |
| Low Global GM | 64 MB |
| High Global GM | 384 MB |
| OS | Ubuntu 14.04 |
| Kernel | 3.180-rc7 |
| Linux/Windows Guest VM Configuration | |
| vCPU | 2 |
| Memory | 1800 MB/2048 MB |
| Low Global GM | 64 MB/128 MB |
| High Global GM | 384 MB |
| OS | Ubuntu 14.04/Windows 7 |

All the VMs are run on one server configured as Table 1, and gScale is applied on gVirt's 2015Q3 release as a patch. To support higher resolution, fence registers have to serve larger graphics memory range. In the test environment of present invention, gScale reserves 300 MB low global graphics memory size to be the fence memory space pool, and this is enough for 15 VMs under the 1920*1080 resolution.

We mainly focus on the 3D workloads, for that in cloud environment graphics processing is still the typical GPU workload. Some 2D workloads are covered too. However, we only use 2D workloads to prove the full functionality of vGPUs hosted by gScale, because 2D workloads can also be accelerated by CPU. For Linux 3D performance, we choose the Phoronix Test Suit 3D marks, including Lightsmark, Nexuiz, Openarena. Urbanterror, and Warsow. Cairo-perf-trace which contains a group of test cases is picked to evaluate Linux 2D performance. For Windows, we use 3DMark06 to evaluate 3D performance. PassMark is chosen to evaluate 2D functionality. All the benchmarks are run under the 1920*1080 resolution. To the best of our knowledge, these 3D benchmarks on Windows and Linux are very GPU intensive, which can fully utilize the provided GPU resource while executing. For hybrid test, we use Linpack, which focuses on digital computing, as the CPU benchmark.

We implemented a test framework that dispatches tasks to each VM. When all the tasks are completed, we collected the test results for analysis. Benchmarks are executed for three times. Usually, the results are very stable, with a deviation less than 3%. However, if the results were not stable, we would execute them for several extra times to get a stable value. When gScale hosts a large amount of VMs, I/O could be a bottleneck. We installed 3 SSD drives in our server and distributed the virtual disks of VMs in these SSD drives to meet VM's I/O requirement. For 3DMark06, the loading process takes a great amount of time, which leads to an unacceptable inaccuracy when run in multiple VMs. Moreover, VMs start loading at the same time, but they cannot process rendering tasks simultaneously due to the different loading speed. To reduce the inaccuracy caused by loading, we run the 3DMark06 benchmark by splitting it into single units and repeat each unit for 3 times. The single units in 3DMark06 are GT1-Return To Proxycon, GT2-Firefly Forest, HDR1-Canyon Flight and HDR2-Deep Freeze, and they are for SM2.0 and SM3.0/HDR performance. In hybrid test, we use similar methodology, except that the benchmark dispatched to half of the VMs is Linpack.

1. Scalability

Figure 10:
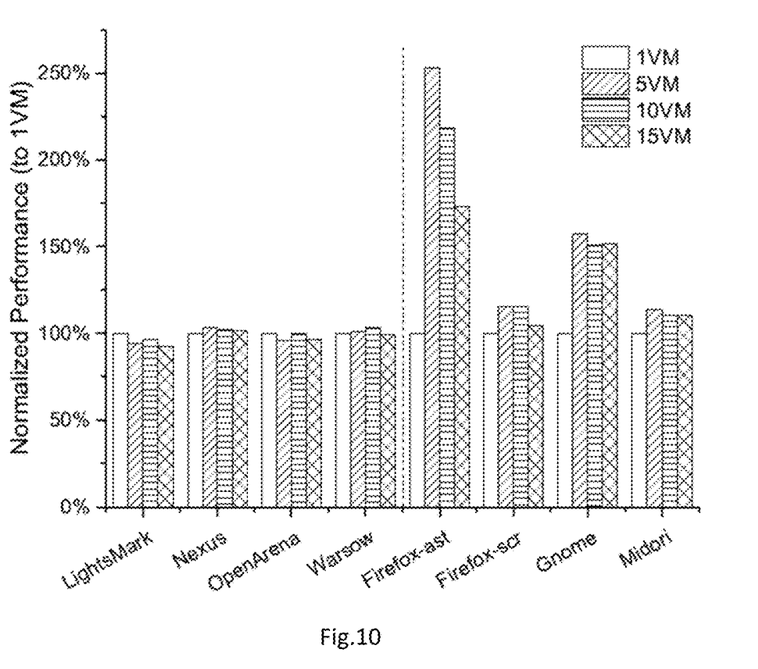
FIG. 10 shows the 2D and 3D performance of Linux VMs hosted by gScale.

In this section, we present the experiments of gScale's scalability on Linux and Windows. FIG. 10 shows the 2D and 3D performance of Linux VMs hosted by gScale, scaling from 1 to 15, and the results of all the tests are normalized to 1 VM. All the 3D performance in this invention is measured by value of frame per second (FPS) given by benchmark. The FPS value is normalized to 1 VM, and higher value means better performance. For all 3D workloads in our test cases, there is negligible performance degradation or no performance degradation. However, there are cases whose performance increase when the number of VMs increases. This result shows that CPU may have some influence on these benchmarks, since CPU is not fully utilized when there is only one VM. For 3D workload Lightsmark, Nexuiz, Openarena, and Warsow, scaling from 5 VM to 15 VM, gScale achieves a negligible performance change. It demonstrates that GPU resource is efficiently shared among multiple VMs. For 2D workload, firefox-ast and gnome increase their performance from 1 VM to 5 VM, for that 2D workloads are also accelerated by CPU. The GPU may not be the performance bottleneck of some benchmark. VMs running those benchmarks are unlikely to consume a lot of GPU resources, especially when the number of VMs is small. Note that the CPU we use has 4 cores with hyperthread technology, and we only assign 2 vCPU to each VM, so when there is only one active VM, the CPU is actually not fully utilized. The performance bottleneck of 3D benchmarks is the GPU, so an obvious performance increment between 1 VM and 5 VM is not observed.

Figure 11:
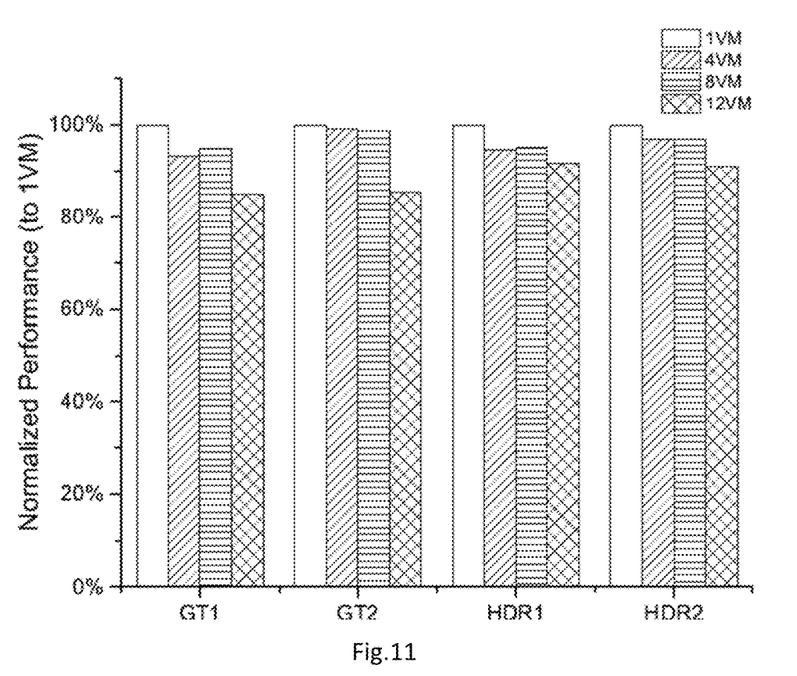
FIG. 11 shows the scalability of gScale in Windows.

The 3D performance of Windows VMs hosted by gScale scaling front 1 to 12 is located in FIG. 11, and all the test results are normalized to 1 VM. Unlike Linux, the performance degradation of Windows benchmarks is more serious. The maximal degradations of GT1, GT2, HDR1, and HDR2 are 13.6%, 14.7%, 8.4%, 9.0% respectively.

At the point of reaching 12 VMs, the performance loss becomes greater than that of less VMs. The reason is that when the number of VMs increases, factors other than GPU, like I/O and cache, limit the performance of gScale. Note that the operating system and some system services also need to be scheduled while OPU is rendering, which leads to some overhead. Linux benchmarks would not have such high performance loss, because Linux system as well as these benchmarks are less CPU and I/O intensive and have less active threads compared to Windows. Given that this performance loss is considered acceptable, this experiment can still prove that the performance scales well from 1 VMs to 12 VMs, and GPU resource is efficiently utilized when the number of VMs increases.

It has to be mentioned that for both Linux and Windows, the maximum number of VMs is not a hard limitation. An Intel (GPU) has only 32 fence registers and these registers are not shadowed in gVirt. Considering that each VM has to occupy at least 2 registers, gScale can only support 15 VMs and 1 host. It is possible to shadow these fence registers to support more VMs. However, in most cases 15 VMs can already fully utilize the Intel GPU in the cloud environment, considering the hardware capacity of Intel GPU. Supporting more VMs brings little benefits to the cloud vendor. Besides, the limitation of 12 VMs of Windows is mainly because the main memory is insufficient with less than 32 GB usable memory.

2. Performance

Figure 12:
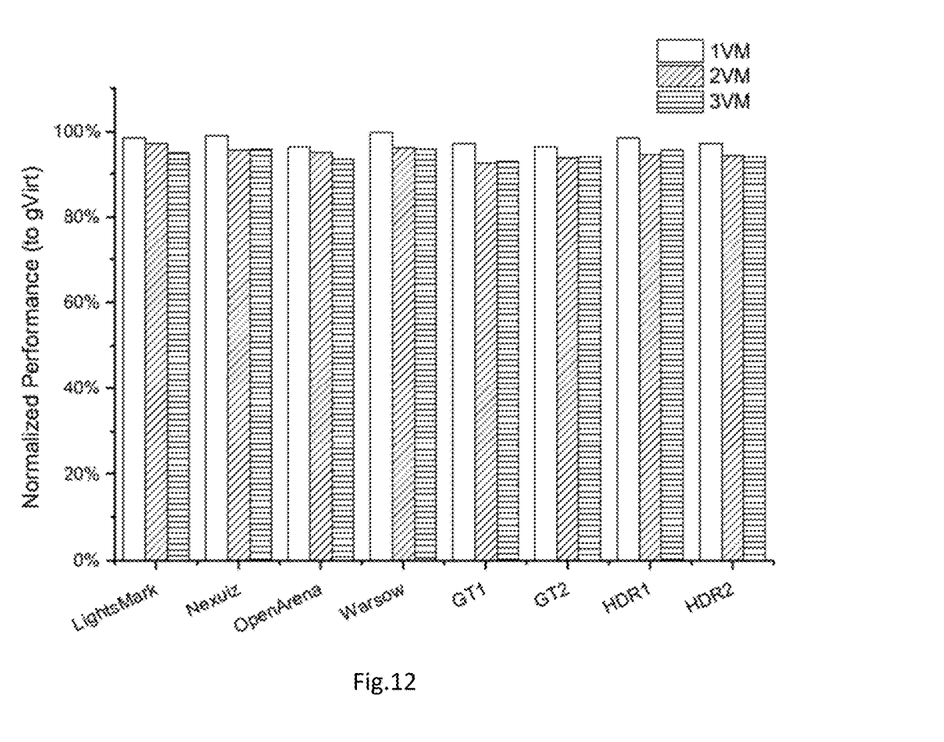
FIG. 12 shows the performance comparison of gScale with gVirt.

The performance of gScale with gVirt is compared in FIG. 12, and the performance gScale is normalized to gVirt. We examine the settings of 1-3 VMs for gScale, since gVirt can only support 3 guest vGPUs. Since there, is only 3 vGPUs, predictive GTT copy and predictive-copy aware scheduling are disabled. For Linux, gScale achieves up to 99.89% performance of gVirt, while for Windows, gScale archives up to 98.58% performance of gVirt. There is a performance drop which is less than 5% of normalized performance when the number of instances is over 1. The performance decrease is due to copying the part of private shadow GTT for low graphics memory, which is shared among all VMs. This overhead is inevitable, for that global graphics memory space sharing will incur the overhead of copying private shadow GTT.

We want to evaluate the slot sharing mechanism and predictive GTT copy mechanism of gScale under a high instance density. We launch 15 VMs (for Linux) or 12 VMs (for Windows) at the same time. However, we only run GPU intensive workloads in some of them, while the rest VMs remain GPU idle. A GPU idle VM means a launched VM without GPU workload. We increase the number of GPU busy VM from 1 to 15 or 1 to 12, and observe the performance change. We use gScale-Basic to represent the gScale without slot sharing, use gScale-Slot to represent gScale with slot sharing but without predictive GTT copy, and use gScale to represent gScale with both slot sharing and predictive GTT copy.

Figure 13:
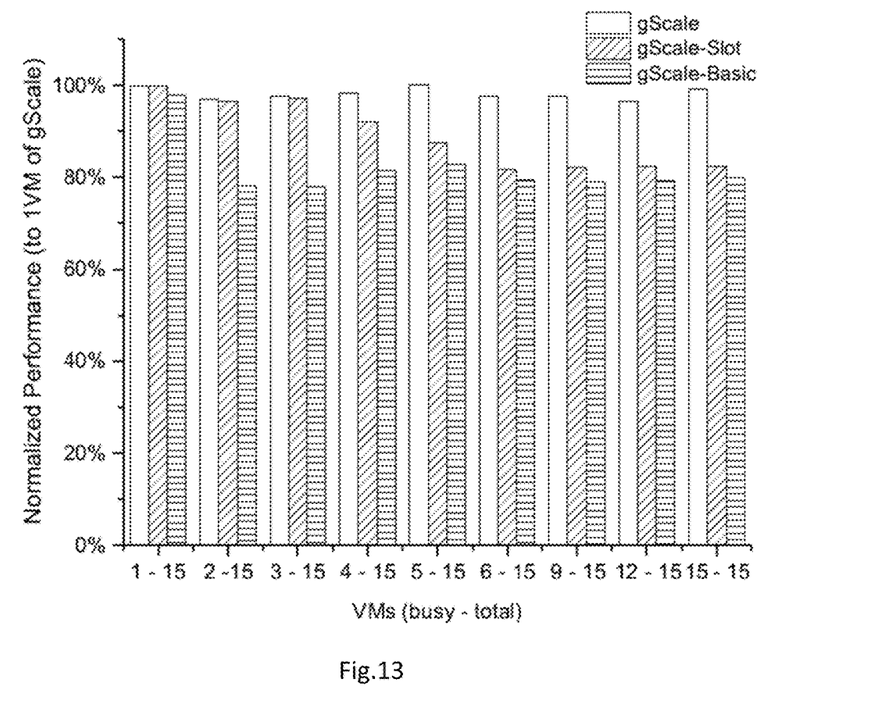
FIG. 13 shows Linux 3D performance comparison between gScale with and without predictive GTT copy and predictive-copy aware scheduling.

For 3D performance of gScale in Linux, we pick Nexuiz as a demonstration, and the case is run in an increasing number of VMs while gScale hosts 15 VMs in total, as shown in FIG. 13. gScale and gScale-Basic has the same performance when the GPU busy VM is only one. When the number of GPU busy VMs increases, private shadow GTT copying happens. There is a 20% performance decrease for gScale-Basic. However, gScale has little performance degradation when the number of GPU busy VMs is less than 4, and slot sharing mitigates the performance degradation when the number of GPU busy VMs is less than 6. However, when the number of GPU busy VMs exceed 6, the slot sharing does not help with the overhead, and the performance is stable around 80% of normalized performance. gScale shows same or similar performance with gScale-Slot when the number of active VMs is less than or equal to three. Under this condition, private shadow GTT copying of high global graphics memory does not happen because of the slot sharing mechanism. However, when the number of active VMs exceeds four, gScale shows significantly better performance than gScale-Slot, since the predictive GTT copy can reduce the GTT copy overhead a lot.

Figure 14:
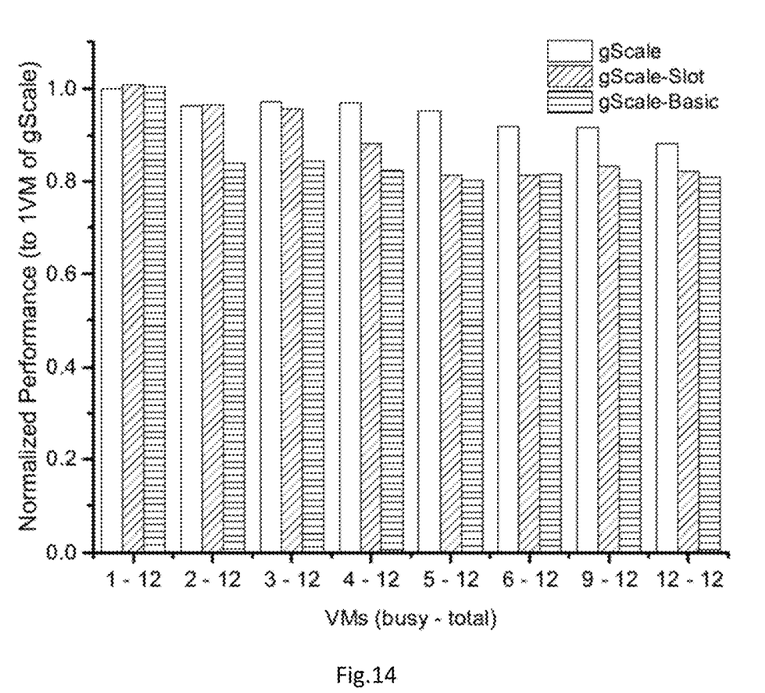
FIG. 14 shows 3D performance comparison between gScale with and without predictive GTT copy and predictive-copy aware scheduling.

For 3D performance of gScale in Windows, GT1 is chosen to run in the rising number of VMs while gScale hosts 12 VMs in total. As shown in FIG. 14, gScale shows the same performance with gScale-Basic when there is only 1 GPU busy VM. However, similar to the results on Linux, when the number of GPU busy VMs is over 1, there is a 16.5% performance degradation for gScale-Basic. gScale achieves a flat performance change when the number of GPU busy VMs is less than 4, and the results show that slot sharing mitigates the performance degradation before the number of GPU busy VMs reaches 6. When the number of GPU busy VMs exceed 6, the performance of gScale and gScale-Basic is very close. The experiment on Linux shows gScale has less performance loss when the number of VMs scales up. However, the performance loss of Windows is a little bit more serious than Linux when the number of VMs increases, because benchmarks on Windows are usually heavier than those on Linux and need more CPU resource.

3. Micro Analysis

Ladder mapping is constructed by gScale when CPU modifies the entry of GTT. We try to figure out the frequency of ladder mapping when 3D workloads are running. We count the total times of GTT modifications and the times of ladder mapping, to calculate the percentage as shown in Table 2. For Windows workloads, the ladder mapping happens very rarely, which is less than 1%. For Linux, the percentage of ladder mapping frequency is higher than Windows, and we believe the reason is that the total amount of GTT modifications in Windows is a lot more than in Linux (up to 8×). At the same time, we observe a phenomenon that the ladder mapping mostly happens when workloads are being loaded, and it seldom happens when workloads are being processed. It explains the flat change of performance in our scalability evaluation, though ladder mapping could have overhead.

TABLE 2

Frequency of Ladder Mapping

| | Lights-Mark | Nexuiz | Open-arena | Warsow | SM2.0 | HDR |
|---|---|---|---|---|---|---|
| L Mapping (k) | 18.8 | 4.67 | 4.9 | 6.6 | 10.2 | 8.1 |
| GTT Modify (k) | 455.3 | 313.5 | 228.5 | 1629.9 | 1134.2 | 1199.7 |
| Percentage | 4.13% | 1.49% | 2.14% | 0.40% | 0.90% | 0.68% |

Figure 15:
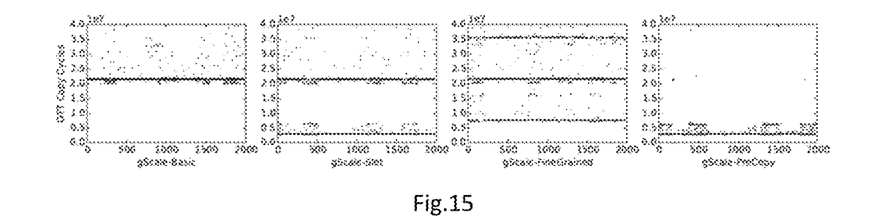
FIG. 15 shows an overhead of Private Shadow GTT.

The overhead caused by copying private shadow GTT is evaluated to show the performance optimization brought by slot sharing, fine-grained slotting, and predictive GTT copy. In this experiment, we launch 4 Linux VMs running Lightsmark. While the benchmark is running, we record the overhead of copying private shadow GTT to the hardware. FIG. 15 shows the result of the experiment. In the figure, gScale-Basic, gScale-Slot, gScale-Fine-Grained and gScale-PreCopy represent the gScale without slot sharing, gScale with slot sharing, gScale with fine-grained slotting and gScale with predictive copy, respectively. VMs in gScale-Basic, gScale-Slot and gScale-PreCopy are configured as Table 1. In gScale-Fine-Grained, to show the performance impact of fine grained slotting, we divide the non-reserved high global GM into 12 subslots, and VM 1-4 occupy 7, 5, 4, 4 subslots, respectively.

In gScale-Slot, we can see that slot sharing can reduce the GTT copying overhead of VM 2 and VM 3. The overhead of VM 1 and VM 4 is approximately unchanged, since they are deployed in the same slot. In gScale-Fine-Grained, the overhead of copying private shadow GTT of VM 1 is larger than that of VM 3 and 4, since VM 1 occupies 7 subslots and has more entries in its private shadow GTT. However, for VM 2, since 4 of its subslots are already on the hardware, the overhead of copying its private shadow GTT greatly reduced. In gScale-Precopy, we can see that the predictive GTT copying mechanism is effective, since the overhead is reduced a lot.

4. Hybrid Test

The performance of gScale is measured in a more cloud-like occasion to confirm the usability of gScale. In this experiment, we launch an increasing even number of Windows VMs, run GPU intensive workloads on half of them, and run CPU intensive workloads on the rest. This design is more faithful to the real cloud environment, in which VMs with CPU intensive workloads and GPU intensive workloads are hosted on the same host. Both gScale with predictive GTT copy and gScale without predictive OTT copy are tested. In the experiment, Linpack, which mainly focus on digital computing, is chosen as the CPU intensive workload, and HDR2 is chosen to be the GPU intensive one. We normalize the data to 2 VMs in this experiment, in which case one runs Linpack and the other runs HDR2. We use gScale-Slot to indicate gScale without predictive GTT copy and predictive copy aware scheduling.

Figure 16:
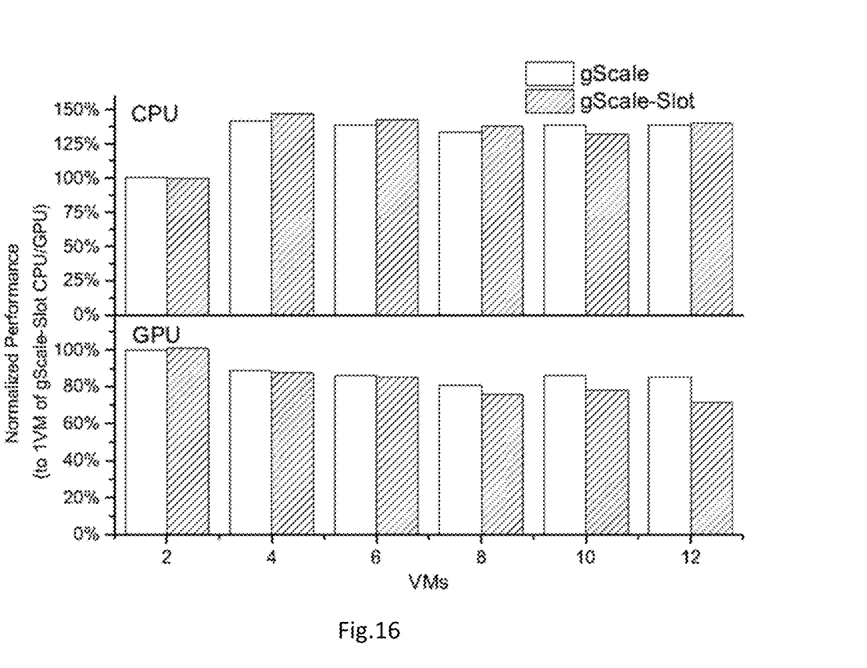
FIG. 16 shows a hybrid Test of Windows VMs.

FIG. 16 shows the result of the experiment. We can see that in the experiment, from 4 VM to 12 VM, the performance of CPU intensive workload scales with and without predictive GTT copy. When there is only 2 VMs, the CPU is not fully utilized, which takes CPU performance bad. When the number of VMs is less than or equal to six, GPU performance of both versions of gScale is nearly the same, because only 2 or 3 VMs are running GPU intensive benchmark and thus predictive GTT copy does not happen. When the number of VMs reach eight and predictive GTT copy happens, the performance of gScale with predictive GTT copy is obviously better than the naive version. However, the performance of both versions is worse than cases with less VMs. The reason is that gScale needs CPU, which is fully utilized, to emulate some operations of guest like modifying GTT and submitting commands.

Predictive GTT copy does have some negative influence on CPU intensive benchmark because it opens a new thread and utilizes some CPU resource. This is also the main cause of the slight performance difference between the two bars when there are 4, 6, 8 VMs. However, the influence is slight enough to be ignored. As a conclusion, predictive GTT copy is still effective when CPU resource is sparse, and it does not have an unacceptable negative impact on CPU intensive workloads.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A method for optimizing a scalable GPU virtualization, comprising:
    providing each vGPU of one or more vGPUs with a private shadow graphics translation table (GTT);
    copying vGPU's private shadow GTT, along with a context switch, to a physical GTT wherein the private shadow GTT allows the one or more vGPUs to share an overlapped range of a global graphics memory space, wherein the global graphics memory space comprises a low global graphics memory space and a high global graphics memory space; and dividing the high global graphics memory space into a plurality of first-slots with each vGPU occupying a number of adjacent first-slots, the number of adjacent first-slots occupying less than a total of the high global graphics memory space.

2. The method of claim 1, further comprising:
sharing the low global graphics memory space among all of the vGPUs by using ladder mapping and a fence memory space pool;
dividing the high global graphics memory space into a plurality of second-slots;
deploying one or more vGPUs in one second-slot.

3. The method of claim 2, further comprising:
predicting a next vGPU that will run in a next time slice;
if adjacent vGPUs in a scheduling sequence are not deployed on a same second-slot, copying a next vGPU's Shadow GTT to its corresponding second-slot while a previous vGPU still occupies GPU to shorten a context switch time.

4. The method of claim 2, further comprising:
arranging a context switch sequence of vGPUs on multiple second-slots.

5. The method of claim 4, wherein arranging the context switch sequence of the vGPUs on the multiple second-slots further comprises:
finding a slot k with a maximum number of vGPUs;
alternately poping the vGPUs from the slot k and other slots; and
inserting the vGPUs into an OutputVmList which indicates a scheduling sequence of a single round.

6. The method of claim 5, wherein arranging the context switch sequence of the vGPUs on the multiple slots further comprises:
if the slot k firstly pops out all of its vGPUs, returning to the step of finding the slot k with the maximum number of vGPUs to determine the scheduling sequence of the vGPUs on other slots; and
if all the other slots firstly pop out their vGPUs while some vGPUs in the slot k are not popped out, inserting all remaining virtual machines (VMs) in the slot k into the OutputVmList.

7. The method of claim 1, further comprising:
non-conducting the context switch for idle vGPU instances; and
non-copying entries from idle vGPU's private shadow GTT to the physical GTT.

8. The method of claim 1, wherein the one or more vGPUs includes: a first vGPU occupying first-slots 1 to 5, and a second vGPU occupying first-slots 4 to 6.

9. An apparatus for optimizing a scalable GPU virtualization, comprising:
one or more guest vGPUs, each having a private shadow graphics translation table (GTT) to allow the one or more guest vGPUs to share an overlapped range of a global graphics memory space, wherein the global graphics memory space comprises a low global graphics memory space and a high global graphics memory space; and
a host vGPU having:
a ladder mapping unit, configured to allow CPU directly access host memory space serving the graphics memory, which bypasses the global graphics memory space, to share the low global graphics memory space among all of the vGPUs;
a fence memory space pool, the fence memory space pool being a dedicated part of the low global graphics memory to work for fence registers, to address malfunction of fence registers;
a fine-grained slotting unit, configured to divide the high global graphics memory space into a plurality of first-slots with each vGPU occupying a number of adjacent first-slots, the number of adjacent first-slots occupying less than a total of the high global graphics memory space; and
a slot sharing unit, configured to divide the high global graphics memory space into a plurality of second-slots and deploy one or more vGPUs in one second-slot.

10. The apparatus of claim 9, wherein the one or more guest vGPUs includes: a first vGPU occupying first-slots 1 to 5, and a second vGPU occupying first-slots 4 to 6.

11. The apparatus of claim 9, wherein the host vGPU further comprises:
a predictive GTT copy unit, configured to predict a next vGPU that will run in a next time slice, wherein:
if adjacent vGPUs in a scheduling sequence are not deployed on a same second-slot, a next vGPU's Shadow GTT is copied to its corresponding second-slot while a previous vGPU still occupies GPU to shorten a context switch time.

12. The apparatus of claim 9, wherein the host vGPU further comprises:
a predictive-copy aware scheduling unit, configured to arrange a context switch sequence of vGPUs on multiple second-slots.

13. The apparatus of claim 12, wherein the predictive-copy aware scheduling unit is further configured to:
find a slot k with a maximum number of vGPUs;
alternately pop the vGPUs from the slot k and other slots; and
insert the vGPUs into an OutputVmList which indicates a scheduling sequence of a single round.

14. The apparatus of claim 13, wherein the predictive-copy aware scheduling unit is further configured to:
if the slot k firstly pops out all of its vGPUs, find again the slot k with the maximum number of vGPUs to determine the scheduling sequence of the vGPUs on other slots; and
if all the other slots firstly pop out their vGPUs while some vGPUs in the slot k are not popped out, insert all remaining virtual machines (VMs) in the slot k into the OutputVmList.

* * * * *